US007409340B2

(12) United States Patent
Holzapfel et al.

(10) Patent No.: US 7,409,340 B2
(45) Date of Patent: Aug. 5, 2008

(54) METHOD AND DEVICE FOR DETERMINING PROSODIC MARKERS BY NEURAL AUTOASSOCIATORS

(75) Inventors: Martin Holzapfel, Munich (DE); Achim Mueller, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 918 days.

(21) Appl. No.: 10/257,312

(22) Filed: Jan. 27, 2003

(65) Prior Publication Data

US 2003/0149558 A1 Aug. 7, 2003

(30) Foreign Application Priority Data

Apr. 12, 2000 (DE) ................................ 100 18 134

(51) Int. Cl.
*G10L 15/16* (2006.01)
*G10L 13/08* (2006.01)

(52) U.S. Cl. ....................................... 704/232; 704/259

(58) Field of Classification Search ................. 704/232, 704/259

See application file for complete search history.

(56) References Cited

U.S. PATENT DOCUMENTS 5,479,563 A * 12/1995 Yamaguchi ................. 704/232
5,668,926 A 9/1997 Karaali et al.
5,704,006 A * 12/1997 Iwahashi .................... 704/259
5,758,023 A * 5/1998 Bordeaux ................... 704/232
6,134,528 A * 10/2000 Miller et al. ................ 704/258

FOREIGN PATENT DOCUMENTS

GB 2 325 599 11/1998
WO 98/19297 5/1998

OTHER PUBLICATIONS

Lastrucci et al. Autoassociator-based modular architecture for speaker independentphoneme recognition, Sep. 6-8, 1994, Neural Networks for Signal Processing [1994] IV. Proceedings of the 1994 IEEE Workshop, pp. 309-318.*

Gori et al., Autoassociator-based models for speaker verification, Mar. 6, 1996, Elsevier, Pattern Recognition Letters, vol. 17, pp. 241-250.*

Chen et al., "An RNN-Based Prosodic Information Synthesizer for Mandarin Text-to Speech", IEEE Transactions on Speech and Audio Processing, vol. 6, No. 3, May 1998, pp. 226-239.

Mueller et al., "Robust Generation of Symbolic Prosody by a Neural Classifier Based on Autoassociators", IEEE International Conference on Acoustics Speech an Signal Processing, Jun. 9, 2000, vol. 3, pp. 1285-1288.

Palmer et al., "Adaptive Multilingual Sentence Boundary Disambiguation", Computational Linguistics, vol. 23, No. 2, Jun. 1997, pp. 241-267.

Ostendorf et al., "A Hierarchical Stochastic Model for Automatic Prediction of Prosodic Boundary Location", Association for Computational Linguistics, vol. 20, No. 1, 1994, pp. 27-54.

Black et al., "Assigning Phrase Breaks from Part-of-Speech Sequences", Conference Eurospeech 1997, 4 pages.

* cited by examiner

*Primary Examiner*—Talivaldis I Smits
(74) *Attorney, Agent, or Firm*—Staas & Halsey LLP

(57) ABSTRACT

A neural network is used to obtain more robust performance in determining prosodic markers on the basis of linguistic categories.

17 Claims, 5 Drawing Sheets

METHOD AND DEVICE FOR DETERMINING PROSODIC MARKERS BY NEURAL AUTOASSOCIATORS

CROSS REFERENCE TO RELATED APPLICATIONS

This application is based on and hereby claims priority to German Application No. 100 18 134.1 filed on Apr. 12, 2000, the contents of which are hereby incorporated by reference.

BACKGROUND OF THE INVENTION

1. Field of the Invention

The present invention relates to a method for determining prosodic markers and a device for implementing the method.

2. Description of the Related Art

In the conditioning of unknown text for speech synthesis in a TTS system ("text to speech" systems) or text/speech conversion systems, an essential step is the conditioning and structuring of the text for the subsequent generation of the prosody. In order to generate prosodic parameters for speech synthesis systems, a two-stage approach is followed. In this case, firstly prosodic markers are generated in the first stage, which markers are then converted into physical parameters in the second stage.

In particular, phrase boundaries and word accents (pitch-accent) may serve as prosodic markers. Phrases are understood to be groupings of words which are generally spoken together within a text, that is to say without intervening pauses in speaking. Pauses in speaking are present only at the respective ends of the phrases, the phrase boundaries. Inserting such pauses at the phrase boundaries of the synthesized speech significantly increases the comprehensibility and naturalness thereof.

In stage 1 of such a two-stage approach, both the stable prediction or determination of phrase boundaries and that of accents pose problems.

A publication entitled "A hierarchical stochastic model for automatic prediction of prosodic boundary location" by M. Ostendorf and N. Veilleux in computational linguistics, 1994, disclosed a method in which "Classification and Regression Trees" (CART) are used for determining phrase boundaries. The initialization of such a method requires a high degree of expert knowledge. In the case of this method, the complexity rises more than proportionally with the accuracy sought.

At the Eurospeech 1997 conference, a method was published entitled "Assigning phase breaks from part-of-speech sequences" by Alan W. Black and Paul Taylor, in which method the phrase boundaries are determined using a "Hidden Markov Model" (HMM). Obtaining a good prediction accuracy for a phrase boundary requires a training text with considerable scope. These training texts are expensive to create, since this necessitates expert knowledge.

SUMMARY OF THE INVENTION

Accordingly, an object of the present invention is to provide a method for conditioning and structuring an unknown spoken text which can be trained with a smaller training text and achieves recognition rates approximately similar to those of known methods which are trained with larger texts.

Accordingly, in a method according to the invention, prosodic markers are determined by a neural network on the basis of linguistic categories. Subdivisions of the words into different linguistic categories are known depending on the respective language of a text. In the context of this invention, 14 categories, for example, are provided in the case of the German language, and e.g. 23 categories are provided for the English language. With knowledge of these categories, a neural network is trained in such a way that it can recognize structures and thus predicts or determines a prosodic marker on the basis of groupings of e.g. 3 to 15 successive words.

In a highly advantageous development of the invention, a two-stage approach is chosen for a method according to the invention, this approach involves acquisition of the properties of each prosodic marker by neural autoassociators and the evaluation of the detailed output information output by each of the autoassociators, which is present as a so-called error vector, in a neural classifier.

The invention's application of neural networks enables phrase boundaries to be accurately predicted during the generation of prosodic parameters for speech synthesis systems.

The neural network according to the invention is robust with respect to sparse training material.

The use of neural networks allows time- and cost-saving training methods and a flexible application of a method according to the invention and a corresponding device to any desired languages. Little additionally conditioned information and little expert knowledge are required for initializing such a system for a specific language. The neural network according to the invention is therefore highly suited to synthesizing texts in a plurality of languages with a multilingual TTS system. Since the neural networks according to the invention can be trained without expert knowledge, they can be initialized more cost-effectively than known methods for determining phrase boundaries.

In one development, the two-stage structure includes a plurality of autoassociators which are each trained to a phrasing strength for all linguistic classes to be evaluated.

Thus, parts of the neural network are of class-specific design. The training material is generally designed statistically asymmetrically, that is to say that many words without phrase boundaries are present, but only few with phrase boundaries. In contrast to methods according to the prior art, a dominance within a neural network is avoided by carrying out a class-specific training of the respective autoassociators.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
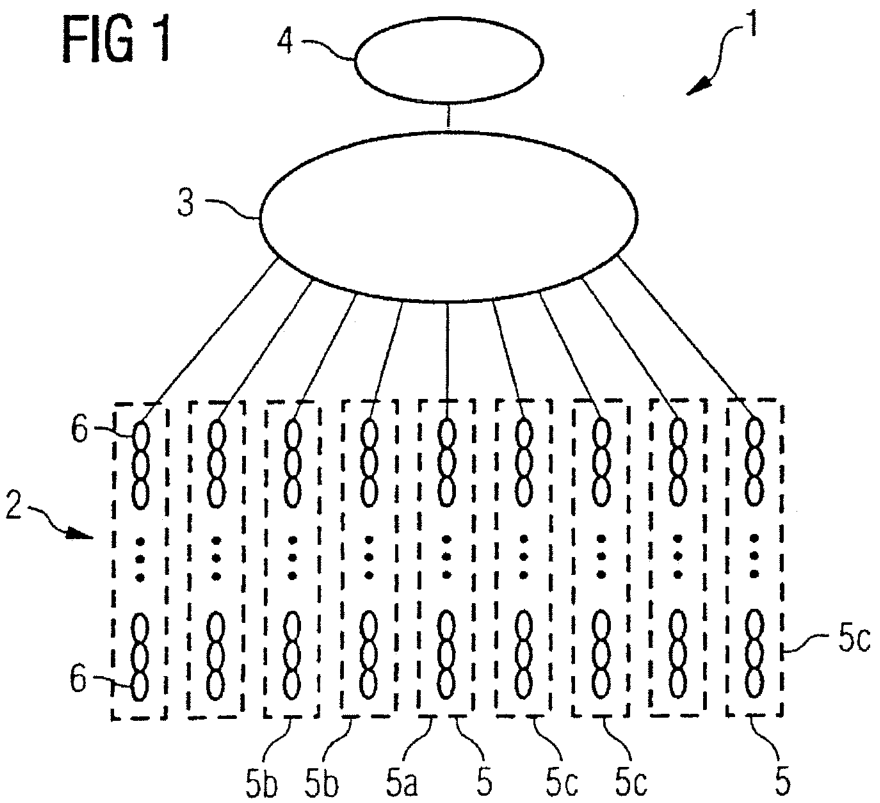
FIG. 1 is a block diagram of a neural network according to the invention.

Reference will now be made in detail to the preferred embodiments of the present invention, examples of which are illustrated in the accompanying drawings, wherein like reference numerals refer to like elements throughout.

FIG. 1 diagrammatically illustrates a neural network 1 according to the invention having an input 2, an intermediate layer 3 and an output 4 for determining prosodic markers. The input 2 is constructed from nine input groups 5 for carrying out a 'part-of-speech' (POS) sequence examination. Each of the input group 5 includes, in adaptation to the German language, 14 neurons 6, not all of which are illustrated in FIG. 1 for reasons of clarity. Thus, a neuron 6 is in each case present for one of the linguistic category. The linguistic categories are subdivided for example as follows:

TABLE 1 linguistic categories

| Category | Description |
|---|---|
| NUM | Numeral |
| VERB | Verbs |
| VPART | Verb particle |
| PRON | Pronoun |
| PREP | Prepositions |
| NOMEN | Noun, proper noun |
| PART | Particle |
| DET | Article |
| CONJ | Conjunctions |
| ADV | Adverbs |
| ADJ | Adjectives |
| PDET | PREP + DET |
| INTJ | Interjections |
| PUNCT | Punctuation marks |

The output 4 is formed by a neuron with a continuous profile, that is to say the output values can all assume values of a specific range of numbers, which encompasses, e.g., all real numbers between 0 and 1.

Nine input groups 5 for inputting the categories of the individual words are provided in the exemplary embodiment shown in FIG. 1. The category of the word of which it is to be determined whether or not a phase boundary is present at the end of the word is applied to the middle input group 5*a*. The categories of the predecessors of the words to be examined are applied to the four input groups 5*b* on the left-hand side of the input group 5*a* and the successors of the word to be examined are applied to the input groups 5*c* arranged on the right-hand side. Predecessors are all words which, in the context, are arranged directly before the word to be examined. Successors are all words which, in the context, are arranged directly succeeding the word to be examined. As a result of this, a context of a maximum nine words is evaluated with the neural network 1 according to the invention as shown in FIG. 1.

During the evaluation, the category of the word to be examined is applied to the input group 5*a*, that is to say that the value +1 is applied to the neuron 6 which corresponds to the category of the word, and the value −1 is applied to the remaining neurons 6 of the input group 5*a*. In a corresponding manner, the categories of the four words preceding or succeeding the word to be examined are applied to the input groups 5*b* or 5*c*, respectively. If no corresponding predecessors or successors are present, as is the case e.g. at the start and at the end of a text, the value 0 is applied to the neurons 6 of the corresponding input groups 5*b*, 5*c*.

A further input group 5*d* is provided for inputting the preceding phrase boundaries. The last nine phrase boundaries can be input at this input group 5*d*.

For the German language—with 14 linguistic categories—the input space has a considerable dimension m of 135 (m=9*14+9). An expedient subdivision of the linguistic categories of the English language has 23 categories, so that the dimension of the input space is 216. The input data form an input vector x with the dimension m.

The neural network according to the invention is trained with a training file containing a text and the information on the phrase boundaries of the text. These phrase boundaries may contain purely binary values, that is to say only information as to whether a phrase boundary is present or whether no phrase boundary is present. If the neural network is trained with such a training file, then the output is binary at the output 4. The output 4 generates inherently continuous output values which, however, are assigned to discrete values by a threshold value decision.

Figure 2:
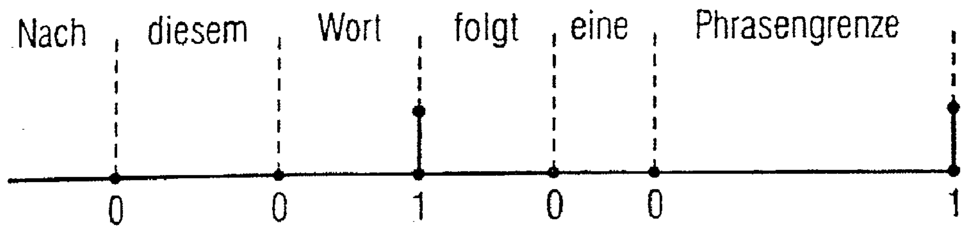
FIG. 2 shows an output with simple phrasing using an exemplary German text.

FIG. 2 illustrates an exemplary sentence which has a phrase boundary in each case after the terms "Wort" and "Phrasengrenze". There is no phrase boundary after the other words in this exemplary sentence.

For specific applications, it is advantageous if the output contains not just binary values but multistage values, that is to say that information about the strength of the phrase boundary is taken into account. For this purpose, the neural network must be trained with a training file containing multistage information on the phrase boundaries. The gradation may have from two stages to inherently as many stages as desired, so that a quasi continuous output can be obtained.

Figure 3:
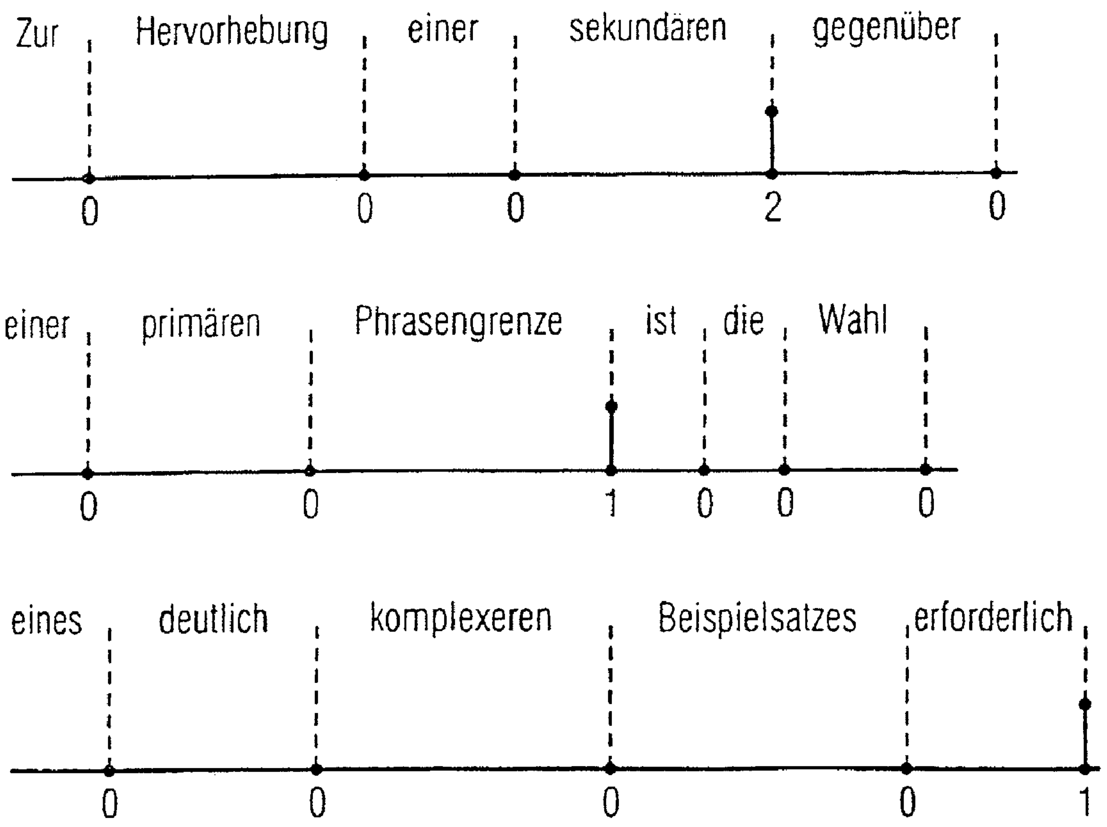
FIG. 3 shows an example of an output with ternary assessment of the phrasing using a German text example.

FIG. 3 illustrates an exemplary sentence with a three-stage evaluation with the output values 0 for no phrase boundary, 1 for a primary phrase boundary and 2 for a secondary phrase boundary. There is a secondary phrase boundary after the term "sekundären" and a primary phrase boundary after the terms "Phrasengrenze" and "erforderlich".

Figure 4:
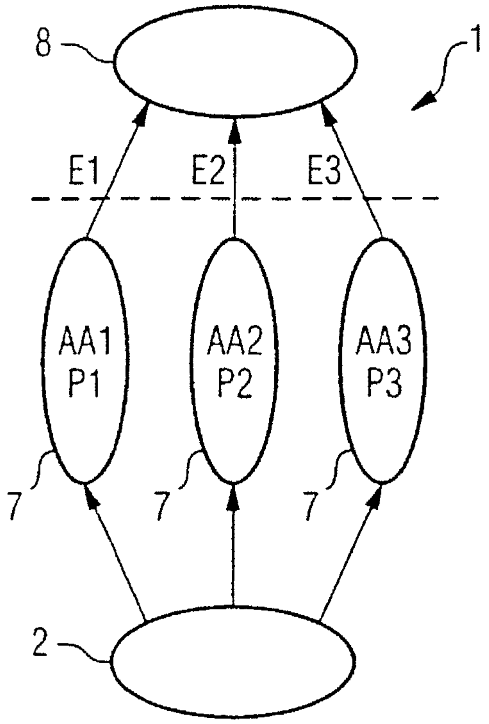
FIG. 4 is a block diagram of a preferred embodiment of a neural network.

FIG. 4 illustrates a preferred embodiment of the neural network according to the invention. This neural network again includes an input 2, which is illustrated merely diagrammatically as one element in FIG. 4 but is constructed in exactly the same way as the input 2 from FIG. 1. In this exemplary embodiment, the intermediate layer 3 has a plurality of autoassociators 7 (AA1, AA2, AA3) which each represent a model for a predetermined phrasing strength. The autoassociators 7 are partial networks which are trained for detecting a specific phrasing strength. The output of the autoassociators 7 is connected to a classifier 8. The classifier 8 is a further neural partial network which also includes the output already described with reference to FIG. 1.

The exemplary embodiment shown in FIG. 4 has three autoassociators, and a specific phrasing strength can be detected by each autoassociator, so that this exemplary embodiment is suitable for detecting two different phrasing strengths and the presence of no phrasing boundary.

Each autoassociator is trained with the data of the class which it represents. That is to say that each autoassociator is trained with the data belonging to the phrasing strength represented by it.

The autoassociators map the m-dimensional input vector x onto an n-dimensional vector z, where n<<m. The vector z is mapped onto an output vector x'. The mappings are effected by matrices $w_1 \epsilon R^{n \times m}$ and $w_2 \epsilon R^{n \times m}$. The entire mapping performed in the autoassociators can be represented by the following formula:

$$x' = w_2 \tan h(w_1 \cdot x),$$

where tan h is applied element by element.

Figure 5A:
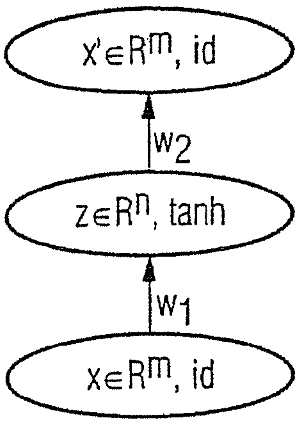
FIG. 5A is a functional block diagram of an autoassociator during training.

The autoassociators are trained in such a way that their output vectors x' correspond as exactly as possible to the input vectors x (FIG. 5A). As a result of this, the information of the m-dimensional input vector x is compressed to the n-dimensional vector z. It is assumed in this case that no information is lost and the model acquires the properties of the class. The compression ratio m:n of the individual autoassociators may vary.

During training, only the input vectors x which correspond to the states in which the phrase boundaries assigned to the respective autoassociators occur are applied to the input and output sides of the individual autoassociators.

Figure 5B:
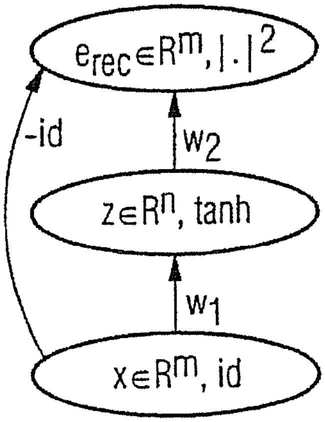
FIG. 5B is a functional block diagram of an autoassociator during operation

During operation, an error vector $e_{rec}=(x-x')^2$ is calculated for each autoassociator (FIG. 5B). In this case, the squaring is effected element by element. This error vector $e_{rec}$ is a "distance dimension" which corresponds to the distance between the vector x' and the input vector x and is thus indirectly proportional to the probability that the phrase boundary assigned to the respective autoassociator is present.

Figure 6:
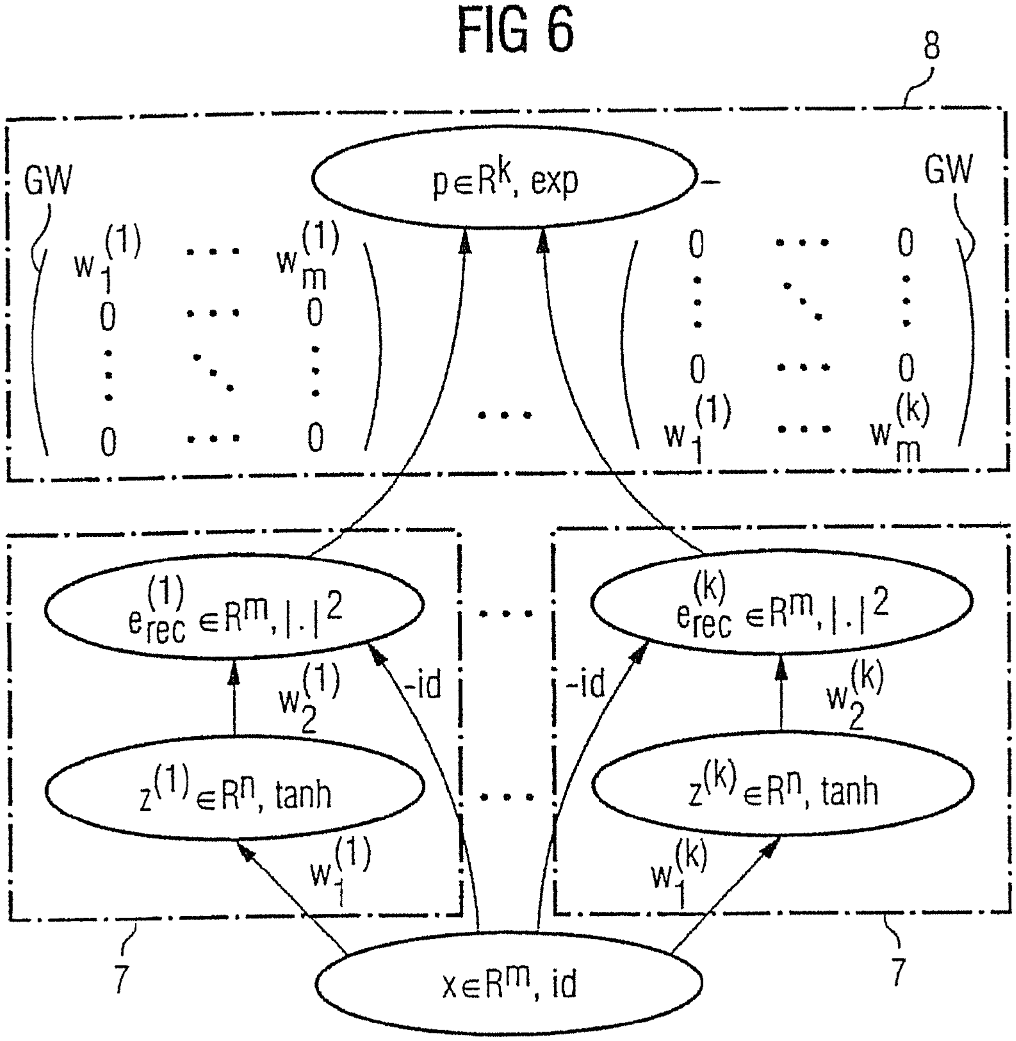
FIG. 6 is a block diagram of the neural network according to FIG. 4 with the mathematical relationships.

The complete neural network including the autoassociators and the classifier is illustrated diagrammatically in FIG. 6. It exhibits autoassociators 7 for k classes.

The elements $p_i$ of the output vector p are calculated according to the following formula:

$$p_i = \frac{e^{(x-A_i(x))^T diag(w_m^{(i)}, \ldots, w_m^{(i)}(x-A_i(x))}}{\sum_{j=1}^{k} e^{(x-A_j(x))^T diag(w_1^{(i)}, \ldots, w_m^{(i)})(x-A_i(x))}},$$

where $A_i(X)=w_2^{(i)} \tan h(w_1^{(i)}x)$ and tan h is performed as an element-by-element operation and $diag(w_1^{(i)}, \ldots, w_m^{(i)}) \epsilon R^{m \times m}$ represents a diagonal matrix with the elements $(w_1^{(i)}, \ldots, w_m^{(i)})$.

The individual elements $p_i$ of the output vector p specify the probability with which a phrase boundary was detected at the autoassociator i.

If the probability $p_i$ is greater than 0.5, this is assessed as the presence of a corresponding phrase boundary i. If the probability $p_i$ is less than 0.5, then this means that the phrase boundary i is not present in this case.

If the output vector p has more than two elements $p_i$, then it is expedient to assess the output vector p in such a way that that phrase boundary is present whose probability $p_i$ is greatest in comparison with the remaining probabilities $p_i$ of the output vector P.

In a development of the invention, it may be expedient, if a phrase boundary is determined whose probability $p_i$ lies in the region around 0.5, e.g. in the range from 0.4 to 0.6, to carry out a further routine which checks the presence of the phrase boundary. This further routine can be based on a rule-driven and on a data-driven approach.

During training with a training file which includes corresponding phrasing information, the individual autoassociators 7 are in each case trained to their predetermined phrasing strength in a first training phase. As is specified above, in this case the input vectors x which correspond to the phrase boundary which is assigned to the respective autoassociator are applied to the input and output sides of the individual autoassociators 7.

In a second training phase, the weighting elements of the autoassociators 7 are established and the classifier 8 is trained. The error vectors $e_{rec}$ of the autoassociators are applied to the input side of the classifier 8 and the vectors which contain the values for the different phrase boundaries are applied to the output side. In this training phase, the classifier learns to determine the output vectors p from the error vectors.

In a third training phase, a fine setting of all the weighting elements of the entire neural network (the k autoassociators and the classifier) is carried out.

The above-described architecture of a neural network with a plurality of models (in this case: the autoassociators) each trained to a specific class and a superordinate classifier makes it possible to reliably correctly map an input vector with a very large dimension onto an output vector with a small dimension or a scalar. This network architecture can also advantageously be used in other applications in which elements of different classes have to be dealt with. Thus, it may be expedient e.g. to use this network architecture also in speech recognition for the detection of word and/or sentence boundaries. The input data must be correspondingly adapted for this.

The classifier 8 shown in FIG. 6 has weighting matrices GW which are each assigned to an autoassociator 7. The weighting matrix GW assigned to the i-th autoassociator 7 has weighting factors $w_n$ in the i-th row.

The remaining elements of the matrix are equal to zero. The number of weighting factors $w_n$ corresponds to the dimension of the input vector, a weighting element $w_n$ in each case being related to a component of the input vector. If one weighting element $w_n$ has a larger value than the remaining weighting elements $w_n$ of the matrix, then this means that the corresponding component of the input vector is of great importance for the determination of the phrase boundary which is determined by the autoassociator to which the corresponding weighting matrix GW is assigned.

Figure 7:
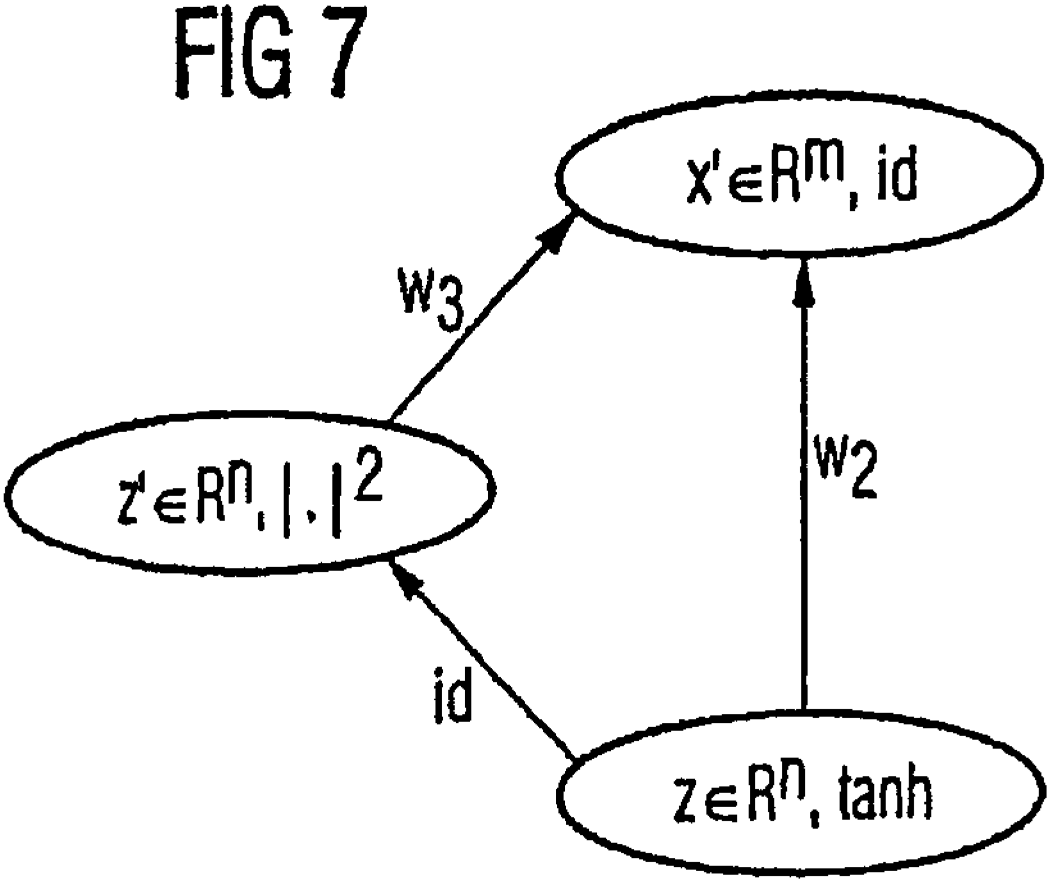
FIG. 7 is a functional block diagram of an extended autoassociator.

In a preferred embodiment, extended autoassociators are used (FIG. 7) which allow better acquisition of nonlinearities. These extended autoassociators perform the following mapping:

$$x'=w_2 \tan h(\bullet)+w_3(\tan h(\bullet))^2,$$

where $(\bullet):=(w_1 \cdot x)$ holds true, and the squaring $(\bullet)^2$ and tan h are performed element by element.

In experiments, a neural network according to the invention was trained with a predetermined English text. The same text was used to train an HMM recognition unit. What were determined as performance criteria were, during operation, the percentage of correctly recognized phrase boundaries (B-corr), of correctly assessed words overall, irrespective of whether or not a phrase boundary follows (overall), and of incorrectly recognized words without a phrase boundary (NB-ncorr). A neural network with the autoassociators according to FIG. 6 and a neural network with the extended autoassociators were used in these experiments. The following results were obtained:

TABLE 2

| | B-corr | Overall | NB-ncorr |
|---|---|---|---|
| ext. Autoass. | 80.33% | 91.68% | 4.72% |
| Autoass. | 78.10% | 90.95% | 3.93 |
| HMM | 79.48% | 91.60% | 5.57% |

The results presented in the table show that neural networks according to the invention yield approximately the same results as an HMM recognition unit with regard to the correctly recognized phrase boundaries and the correctly recognized words overall. However, the neural networks according to the invention are significantly better than the HMM recognition unit with regard to the erroneously detected phrase boundaries, at places where there is inherently no phrase boundary. This type of error is particularly serious in speech-to-text conversion, since these errors generate an incorrect stress that is immediately noticeable to the listener.

In further experiments, one of the neural networks according to the invention was trained with a fraction of the training text used in the above experiments (5%, 10%, 30%, 50%). The following results were obtained in this case:

TABLE 3

| Fraction of the training text | B-corr | Overall | NB-ncorr |
|---|---|---|---|
| 5% | 70.50% | 89.96% | 4.65% |
| 10% | 75.00% | 90.76% | 4.57% |
| 30% | 76.30% | 91.48% | 4.16% |
| 50% | 78.01% | 91.53% | 4.44% |

Excellent recognition rates were obtained with fractions of 30% and 50% of the training text. Satisfactory recognition rates were obtained with a fraction of 10% and 5% of the original training text. This shows that the neural networks according to the invention yield good recognition rates even with sparse training. This represents a significant advance compared with known phrase boundary recognition methods, since the conditioning of training material is cost-intensive since expert knowledge must be used here.

The exemplary embodiment described above has k autoassociators. For precise assessment of the phrase boundaries, it may be expedient to use a large number of autoassociators, in which case up 20 autoassociators may be expedient. This results in a quasi continuous profile of the output values.

The neural networks described above are realized as computer programs which run independently on a computer for converting the linguistic category of a text into prosodic markers thereof. They thus represent a method which can be executed automatically.

The computer program can also be stored on an electronically readable data carrier and thus be transmitted to a different computer system.

Figure 8:
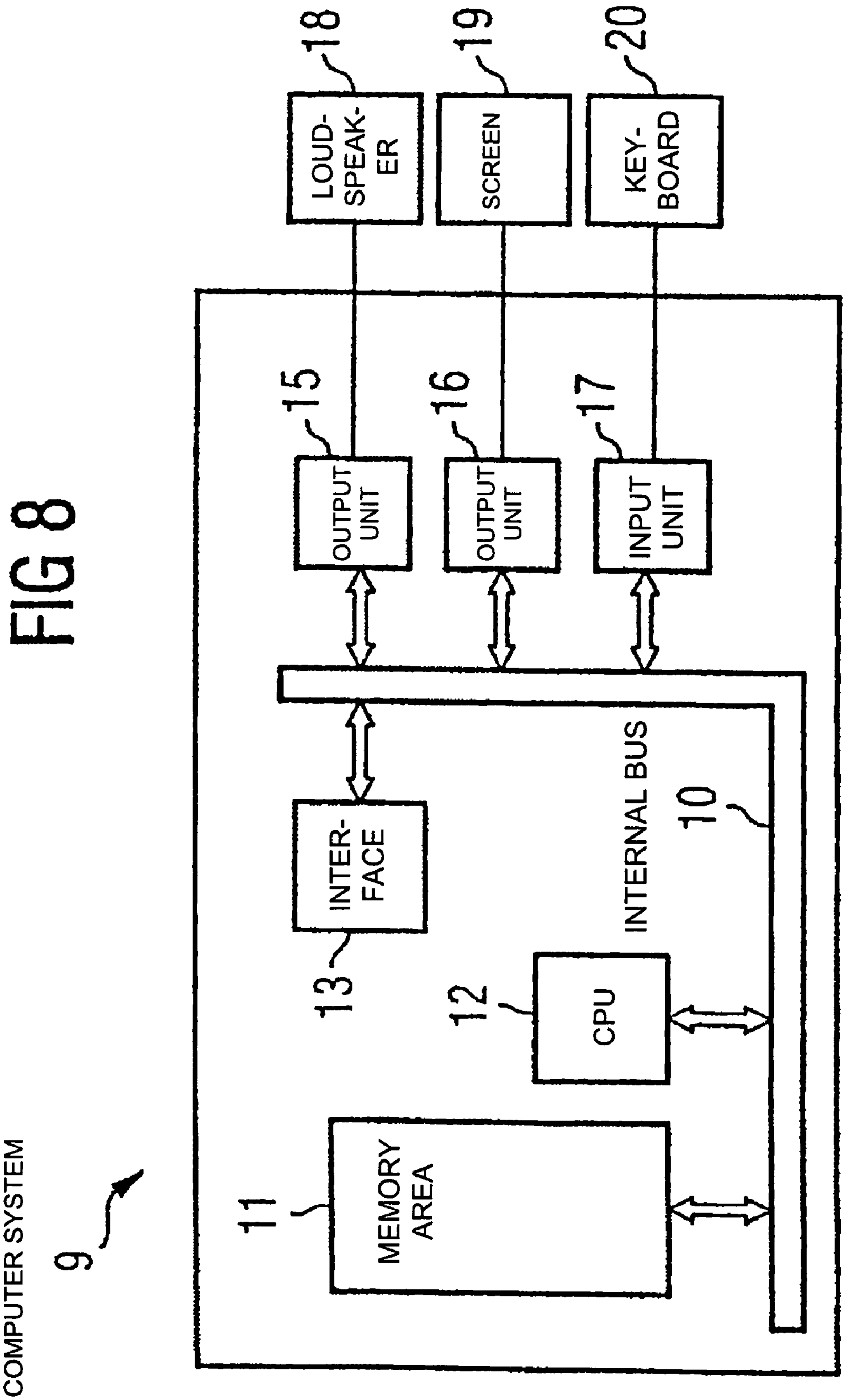
FIG. 8 is a block diagram of a computer system for executing the method according to the invention.

A computer system which is suitable for application of the method according to the invention is shown in FIG. 8. The computer system 9 has an internal bus 10, which is connected to a memory area 11, a central processor unit 12 and an interface 13. The interface 13 produces a data link to further computer systems via a data line 14. Furthermore, an acoustic output unit 15, a graphical output unit 16 and an input unit 17 are connected to the internal bus. The acoustic output unit 15 is connected to a loudspeaker 18, the graphical output unit 16 is connected to a screen 19 and the input unit 17 is connected to a keyboard 20. Texts can be transmitted to the computer system 9 via the data line 14 and the interface 13, which texts are stored in the memory area 11. The memory area 11 is subdivided into a plurality of areas in which texts, audio files, application programs for carrying out the method according to the invention and further application and auxiliary programs are stored. The texts stored as a text file are analyzed by predetermined program packets and the respective linguistic categories of the words are determined. Afterward, the prosodic markers are determined from the linguistic categories by the method according to the invention. These prosodic markers are in turn input into a further program packet which uses the prosodic markers to generate audio files which are transmitted via the internal bus 10 to the acoustic output unit 15 and are output by the latter as speech at the loudspeaker 18.

Only an application of the method to the prediction of phrase boundaries has been described in the examples illustrated here. However, with similar construction of a device and an adapted training, the method can also be utilized for the evaluation of an unknown text with regard to a prediction of stresses, e.g. in accordance with the internationally standardized ToBI labels (tones and breaks indices), and/or the intonation. These adaptations have to be effected depending on the respective language of the text to be processed, since prosody is always language-specific.

The invention has been described in detail with particular reference to preferred embodiments thereof and examples; but it will be understood that variations and modifications can be effected within the spirit and scope of the invention.

The invention claimed is:

1. A method for determining prosodic markers, phrase boundaries and word accents serving as prosodic markers, comprising:

determining prosodic markers by a neural network based on linguistic categories;

acquiring properties of each prosodic marker by neural autoassociators, each trained to one specific prosodic marker; and evaluating output information from each of the neural autoassociators in a neural classifier.

2. The method as claimed in claim 1, wherein said determining the prosodic markers determines phrase boundaries.

3. The method as claimed in claim 2, further comprising at least one of evaluating and assessing the phrase boundaries.

4. The method as claimed in claim 3, further comprising applying the linguistic categories of at least three words of a text to be synthesized to an input of the neural network.

5. The method as claimed in claim 4, further comprising training the autoassociators for a respective predetermined phrase boundary.

6. The method as claimed in claim 5, further comprising training the neural classifier after said training of all of the autoassociators.

7. The method of claim 1, wherein the linguistic categories are defined for at least one language and at least some of the linguistic categories correspond to parts of speech.

8. A neural network for determining prosodic markers, phrase boundaries and word accents serving as prosodic markers, comprising:

an input to acquire linguistic categories of words of a text to be analyzed;

an intermediate layer, coupled to said input, to acquire properties of each prosodic marker by neural autoassociators, each neural autoassociator trained to one specific prosodic marker and to output information evaluated in a neural classifier; and an output, coupled to said intermediate layer.

9. The neural network as claimed in claim 8, wherein said input includes input groups having a plurality of neurons each assigned to a linguistic category, and each input group serves for acquiring the linguistic category of a word of the text to be analyzed.

10. The neural network as claimed in claim 9, wherein said output includes at least one of a binary, a tertiary and a quaternary phrasing stage.

11. The neural network as claimed in claim 10, wherein said output includes a quasi-continuous phrasing region.

12. The neural network of claim 8, wherein the linguistic categories are defined for at least one language and at least some of the linguistic categories correspond to parts of speech.

13. A computer readable medium storing at least one program to control a processor to simulate a neural network comprising:

an input to acquire linguistic categories of words of a text to be analyzed;

an intermediate layer, coupled to said input, to acquire properties of each prosodic marker by neural autoassociators, each neural autoassociator trained to one specific prosodic marker and to output information evaluated in a neural classifier; and an output, coupled to said intermediate layer.

14. The computer readable medium as claimed in claim 13, wherein said input of the neural network includes input groups having a plurality of neurons each assigned to a linguistic category, and each input group serves for acquiring the linguistic category of a word of the text to be analyzed.

15. The computer readable medium as claimed in claim 14, wherein said output of the neural network includes at least one of a binary, a tertiary and a quaternary phrasing stage.

16. The computer readable medium as claimed in claim 15, wherein said output of the neural network includes a quasi-continuous phrasing region.

17. The computer-readable medium of claim 13, wherein the linguistic categories are defined for at least one language and at least some of the linguistic categories correspond to parts of speech.

* * * * *